United States Patent
Billingsley et al.

(10) Patent No.: US 6,361,850 B1
(45) Date of Patent: Mar. 26, 2002

(54) RETROREFLECTIVE ARTICLE HAVING A COLORED LAYER CONTAINING A DYE COVALENTLY BONDED TO A POLYMER

(75) Inventors: Britton G. Billingsley, St. Paul; Robert J. Fleming, Lake Elmo, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/334,729

(22) Filed: Jun. 17, 1999

(51) Int. Cl.⁷ .................................................. B32B 9/04
(52) U.S. Cl. ........................ 428/143; 428/141; 428/144; 428/206; 428/913; 359/518
(58) Field of Search .................................. 428/141, 143, 428/195, 207, 199, 206, 204, 210, 67, 913, 144; 359/518, 529, 530

(56) References Cited

U.S. PATENT DOCUMENTS

| | | |
|---|---|---|
| 2,567,233 A | 9/1951 | Palmquist et al. ............... 88/82 |
| 3,551,025 A | 12/1970 | Bingham et al. ............ 350/105 |
| 3,700,305 A | 10/1972 | Bingham ..................... 350/105 |
| 3,758,192 A | 9/1973 | Bingham ..................... 350/105 |
| 3,879,336 A * | 4/1975 | Maeda et al. .................. 260/37 |
| 4,026,931 A | 5/1977 | Wiesel et al. ........... 260/2.5 AK |
| 4,102,562 A | 7/1978 | Harper et al. ................ 350/105 |
| 4,284,729 A | 8/1981 | Cross et al. .................. 521/158 |
| 4,507,407 A | 3/1985 | Kluger et al. ................ 521/113 |
| 4,605,461 A | 8/1986 | Ogi .............................. 156/233 |
| 4,678,695 A | 7/1987 | Tung et al. ................... 428/120 |
| 4,763,985 A | 8/1988 | Bingham ..................... 350/105 |
| 5,200,262 A | 4/1993 | Li ................................ 428/266 |
| 5,344,705 A | 9/1994 | Olsen .......................... 428/323 |
| 5,451,447 A | 9/1995 | Li ................................ 428/143 |
| 5,474,827 A | 12/1995 | Crandall et al. ............... 428/67 |
| 5,503,906 A | 4/1996 | Olsen .......................... 428/195 |
| 5,612,119 A | 3/1997 | Olsen et al. ................. 428/195 |
| 5,620,613 A | 4/1997 | Olsen ............................ 216/24 |
| 5,645,938 A * | 7/1997 | Crandell ................... 428/411.1 |
| 5,679,198 A | 10/1997 | Olsen et al. ................. 156/230 |
| 5,812,317 A * | 9/1998 | Billingsley et al. ......... 359/536 |

FOREIGN PATENT DOCUMENTS

| | | |
|---|---|---|
| WO | WO 95/31739 | 11/1995 |
| WO | WO 96/16343 | 5/1996 |
| WO | WO 97/10378 | 3/1997 |
| WO | WO 98/28642 | 7/1998 |
| WO | WO 99/21937 | 5/1999 |

OTHER PUBLICATIONS

Reactint Polyurethane Colorants; Milliken Chemicals; R–307–13, R–307–15, Jul. 1995.

\* cited by examiner

Primary Examiner—Blaine Copenheaver
Assistant Examiner—Alicia Chevalier
(74) Attorney, Agent, or Firm—Karl G. Hanson (57) ABSTRACT

An exposed lens retroreflective article 10 that comprises a layer of optical elements 12 that are partially embedded in a binder layer 14. A reflective layer 16 is disposed functionally behind the optical elements 12, and a colored layer 18 is disposed between the reflective layer 16 and the optical elements 12. The colored layer 18 is colored by a dye that is covalently bonded to a polymer. The exposed lens retroreflective article can retain its color and retroreflective abilities well after multiple industrial washing cycles. The article therefore may be particularly suited for use on clothing such as a fireman's jacket.

24 Claims, 1 Drawing Sheet

RETROREFLECTIVE ARTICLE HAVING A COLORED LAYER CONTAINING A DYE COVALENTLY BONDED TO A POLYMER

The present invention pertains to an exposed lens retroreflective article that includes a colored layer that has a dye that is covalently bonded to a polymer.

BACKGROUND

Persons who work or exercise near motor vehicle traffic can be made safer by wearing clothing that highlights the person's presence to passing motor vehicles. To promote the safety of roadway workers and pedestrians, clothing manufacturers commonly produce bright clothing to make the wearer more conspicuous. Manufacturers also regularly secure retroreflective articles to the outer surface of the clothing to improve wearer conspicuity. Retroreflective articles are passive devices that return incident light back toward the light source. The articles highlight a person's presence to motorists at nighttime by reflecting light from the motor vehicle's headlamps back to the motor vehicle driver. The bright image displayed by the retroreflective article ultimately gives motorists more time to react.

Sometimes the retroreflective articles are colored for aesthetic reasons or to provide enhanced contrast for better daytime visibility. Frequently, fluorescent colors are used in conjunction with retroreflective sheeting to make the sheeting more conspicuous under daytime viewing conditions (see, for example, U.S. patent application Ser. No. 08/587,339 pending or corresponding International Publication WO 95/31739 and U.S. Pat. Nos. 3,830,682, 5,387,458, and 5,695,853).

Because retroreflective articles are regularly used on clothing, they must be able to withstand laundering conditions—otherwise, the articles cannot continue to serve their safety function after repeated washings. Investigators at the 3M Company who design retroreflective articles for use on clothing are aware of this problem, and they have developed launderably-durable retroreflective articles so that persons who wear retroreflective clothing remain conspicuously visible after their clothing has been laundered many times. U.S. Pat. Nos. 5,200,262, 5,283,101, 5,474,827, 5,645,938, 5,738,746, and 5,812,317 disclose examples of launderably durable retroreflective articles developed at 3M. These products typically comprise optical elements that are partially embedded in a specially formulated binder layer.

Investigators also recognize that the need to develop launderably durable retroreflective articles is particularly pronounced for clothing that regularly is worn in harsh environments. Examples of such clothing include firemen's jackets and construction workers' safety vests (see, for example, U.S. Pat. No. 4,533,592 to Bingham). These garments tend to get very dirty, very often, and therefore they are frequently cleaned under industrial laundering conditions. Industrial laundering conditions involve wash temperatures as high as 40 to 90° C. (105 to 190° F.) and pH values of 10 to 13. Some of the launderably durable retroreflective articles disclosed in the 3M patents mentioned above are capable of withstanding the more stringent industrial wash conditions.

In some retroreflective articles, a colored appearance has been achieved by placing a colored polymeric layer on top of the optical elements. Retroreflective articles that contain optical elements partially embedded in a polymeric top layer (also referred to as a cover film) are commonly referred to as "enclosed lens" retroreflective articles. In addition to providing color, the polymeric top film allows the article to be easily wiped clean, and the articles generally exhibit good retroreflectivity when wet. Examples of patents that disclose colored top films include U.S. Pat. Nos. 5,069,964 and 5,378,520. In these retroreflective articles, a dye or pigment is added to the top film. Commercially available products that have a colored top film include 3M Scotchlite™ 7960 and 7987 brand products.

An alternative to enclosed lens retroreflective articles are "exposed lens" retroreflective articles, which have the optical elements exposed to the ambient environment—that is, the optical elements are not covered by a polymeric top film. These articles generally include an exposed layer of transparent microspheres, a polymeric binder layer, and a reflective layer. The transparent microspheres are partially embedded in the binder layer and are partially exposed to the atmosphere, and the reflective layer is generally disposed between the microspheres and the binder layer.

Another kind of retroreflective article is an "encapsulated lens" retroreflective article. These articles are similar to enclosed lens articles in that they employ a top film over the layer of microspheres. Encapsulated lens retroreflective articles, however, differ from enclosed lens articles by having the top film encapsulate a pocket of air above the layer of microspheres. U.S. Pat. No. 4,025,159 to McGrath, U.S. Pat. No. 4,896,943 to Tolliver et al., U.S. Pat. No. 4,897,136 to Bailey et al., and U.S. Pat. No. 5,069,964 to Tolliver et al. disclose examples of encapsulated lens type products. In one variation of an encapsulated lens retroreflective sheeting (disclosed by Tung et al. in U.S. Pat. No. 4,678,695), transparent microspheres are partially embedded in a binder layer, and a clear or colored top film is disposed over the microspheres. The binder layer may impregnated with a white pigment, or, alternatively, with a colored pigment to make a sheeting that displays a corresponding daytime color and exhibits nighttime reflection.

These three systems, exposed lens, enclosed lens, and encapsulated lens sheetings, have various advantages and disadvantages relative to one another, and coloring techniques applicable to one system are not necessarily applicable to the other. Exposed lens articles tend to be more flexible and simpler in construction but cannot be colored simply by including a dye in a top film because the articles have no top film. Enclosed lens and encapsulated lens articles, while being somewhat easier to color, generally suffer from the drawback of not being very useful at high temperatures because the polymeric top film can melt. Enclosed lens and encapsulated lens articles, therefore, do not rate as high as exposed lens articles when considering candidate for the use on firefighters' jackets.

A variety of methods, however, have been employed to impart color to exposed lens retroreflective articles. In U.S. Pat. No. 3,700,305, for example, Bingham discloses an exposed lens retroreflective article that has alternating layers of different refractive index dielectric materials coated on glass microspheres. A colored layer, such as a fluorescent layer, is applied behind the dielectric reflector. Because the dielectric reflector is essentially transparent under daytime viewing conditions, the fluorescent layer imparts a daytime fluorescent color to the article. Under nighttime or retroreflective viewing conditions, however, the article is basically incapable of displaying the color of the underlying colored layer because incident light never strikes that layer: it is first reflected by the dielectric reflector back towards the light source. The patent is silent regarding durability under home wash or industrial laundering conditions.

Other methods of coloring an exposed lens retroreflective article are discussed briefly in U.S. Pat. Nos. 3,758,192, 4,102,562, and 5,200,262. In U.S. Pat. No. 3,758,192, Bingham discloses an exposed lens retroreflective article that has transparent microspheres partially embedded in a binder layer that contains flakes of nacreous (pearlescent) pigment and other various pigments or dyes. While this product can display a colored retroreflective image, there is nothing in the patent which shows that the product would be industrial wash durable. In U.S. Pat. No. 4,102,562 to Harper et al., an exposed lens retroreflective article is disclosed that can display a colored imagewise pattern. The article has transparent microspheres coated with a transparent dielectric mirror prepared as described in U.S. Pat. No. 3,700,305 to Bingham. An ink layer that contains a pigment and a melamine is applied behind the reflective layer (see Example 2). Harper et al. state that the melamine reacts with the epoxide moiety of the adhesion promoting silane (see Example 2). Because the ink layer is disposed behind the reflective layer, the article, while being able to display the colored image under daytime viewing conditions, is not capable of displaying a colored retroreflective image. The patent also does not show that the retroreflective articles would be durable under industrial wash conditions. Wu-Shyong Li, in U.S. Pat. No. 5,200,262, partially embeds transparent microspheres in a binder layer that may be colored by a pigment or dye, preferably a black dye such as a chromium-azo dye. Li suggests the use of a metal layer or dielectric material as a reflector. The reflector is located on the embedded portion of the transparent microspheres. When a metal reflector is used, the color of the underlying binder layer is not noticeable under daytime or nighttime viewing conditions. And when a dielectric reflector is used, the color of the underlying binder layer is not noticeable under nighttime (i.e., retroreflective) viewing conditions. Li's product is, however, designed to withstand industrial wash conditions.

Ulf Olsen, in U.S. Pat. Nos. 5,344,705, 5,503,906, and 5,620,613, discloses exposed lens retroreflective articles that have a color layer printed on the embedded portion of a layer of transparent microspheres. The color layer typically contains a transparent pigment or dye that is substantially uniformly dispersed in a transparent resin. The color layer is disposed between the microspheres and a reflective layer, which reflective layer comprises reflective flakes in a transparent resin. Olsen also discloses that the color layer and the reflective layer may be replaced by a colored reflective layer comprising both colorant and reflective flakes in a transparent resin. While this product can display a colored image under retroreflective conditions, it does not indicate that good wash durability would be achieved under industrial conditions.

In U.S. Pat. Nos. 5,510,178, 5,612,119, 5,679,198, and 5,785,790, Ulf Olsen describes an exposed lens retroreflective product that has an imagewise colored coating disposed behind a transparent dielectric mirror that is coated on the backside of microspheres partially embedded in a binder layer. The colored image in this product is, however, not noticeable under retroreflective conditions; it can only be seen under daytime lighting conditions.

SUMMARY OF THE INVENTION

The present invention provides a new, exposed lens retroreflective article that can exhibit color under retroreflective conditions and that can demonstrate extraordinary durability under industrial wash conditions. In brief summary, the inventive exposed lens retroreflective article comprises: a layer of optical elements, a colored layer, a binder layer, and a reflective layer. The optical elements are partially embedded in the binder layer, and the colored layer and the reflective layer are disposed behind the layer of optical elements such that incident light first passes through the colored layer before striking the reflective layer. The reflective layer is located functionally behind the optical elements to make it capable of returning incident light back into the optical elements. The colored layer is colored by a dye that is covalently bonded to a polymer. Unlike conventional color layers, which contain pigments or dyes that are physically suspended within a polymer matrix, the dye in the colored layer of the present invention is connected to the polymer molecule by a covalent bond.

In another aspect, the present invention provides a new transfer for supplying a retroreflective article to a garment assembler. In a further aspect, the invention provides an article of clothing that has the inventive retroreflective article disposed on its outer surface.

The colored, exposed lens, retroreflective articles of the invention differ from known exposed lens articles by having the dye covalently bonded to the polymer in the colored layer and by placing this colored layer between the optical elements and the reflective layer. The inventive retroreflective articles can demonstrate improved durability in that they maintain retroreflectivity and their original color even after multiple episodes of industrial laundering. The color durability of these articles, as compared to articles employing conventional dyes or pigments, is believed to result from the covalent bond(s) that connect the dye to the polymer. These relatively high strength bonds can make the dyes resistant to dissociation from the polymer and consequent extraction from the retroreflective article. The improved laundering durability makes the inventive retroreflective articles particularly suitable for use on safety garments such as utility, construction, and sanitation workers' garments.

The placement of the colored layer between the optical elements and the binder layer enables a colored image to be seen under both daytime and retroreflective conditions. Light striking the front surface of the retroreflective article passes through the colored layer before and after it is reflected by the reflective layer. This enables a viewer of the retroreflected light to see the color of the colored layer. The color is also noticeable under daytime viewing conditions because the colored layer can be seen beneath the layer of transparent optical elements.

GLOSSARY

In reference to the invention, the following terms have the meanings set forth below:

A "binder layer" is a polymeric layer that provides assistance in structurally supporting a layer of partially embedded optical elements.

A "colored layer" is a layer that is not colorless or clear.

"Covalent bonds" are those bonds in which valence electrons are shared, examples include carbon-carbon, carbon-nitrogen, and carbon-oxygen bonds.

A "chromophore" means any chemical group, such as the azo group, that gives color to a compound.

A "dye" is an organic or organometallic molecule or moiety that contains a chromophore that absorbs light of a particular wavelength(s) to impart color to the colored layer. In the inventive retroreflective article, the dye shares covalent bond(s) with a polymer.

The language "functionally behind" means that the reflective layer is positioned relative to the layer of optical elements such that the reflective layer is capable of reflecting incident light back into the optical elements.

"Exposed lens retroreflective articles" are retroreflective articles that have optical elements partially embedded in the retroreflective article and partially exposed to the atmosphere.

"Optical elements" are light transmissive elements capable of affecting the direction of light that enters the elements so that the light ultimately can be returned toward the light source.

"Polymer" means a molecule that is made up of at least five repeating units that are regularly or irregularly arranged.

"Polymeric" means containing a polymer.

"Retroreflective" means having the characteristic that obliquely incident incoming light is reflected in a direction antiparallel (180 degrees) to the incident direction, or nearly so, such that an observer at or near the light source can detect the reflected light.

A "reflective layer" is a layer that is capable of reflecting incident light so that it can reenter the optical elements.

BRIEF DESCRIPTION OF THE DRAWINGS

In the drawings:

FIGS. 1–3 generally depict an article of the invention and are not drawn to scale.

DETAILED DESCRIPTION OF PREFERRED EMBODIMENTS

Figure 1:
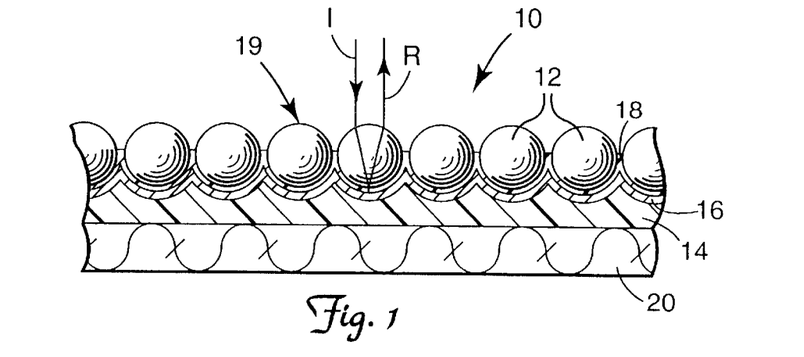
FIG. 1 is a cross-sectional view of an exposed lens retroreflective article 10 in accordance with the present invention.

FIG. 1 illustrates an exposed lens retroreflective article 10 that includes optical elements such as microspheres 12. The microspheres 12 are partially embedded in or supported by a binder layer 14. Located between the binder layer 14 and the optical elements 12 are a colored layer 18 and a reflective layer 16. The colored layer 18 is disposed between the microspheres 12 and the reflective layer 16. The microspheres 12 and the reflective layer 16 operate together to return a substantial quantity of incident light back towards the light source. Incident light 1 that strikes the retroreflective article's front surface 19 passes sequentially through microspheres 12 and colored layer 18 to be reflected by layer 16 to again pass through colored layer 18 to reenter the microspheres 12, where the light's direction is then altered to return toward the light source as noted by beam R. The colored layer 18 and the reflective layer 16 each generally are very thin relative to binder layer 14. Although the binder layer 14 can often provide the article with sufficient structural integrity, the retroreflective article 10 sometimes includes a substrate 20, such as a fabric, film, or scrim, to further enhance the article's structural integrity.

The optical elements preferably are microspheres that are substantially spherical in shape to provide uniform and efficient retroreflection. The microspheres preferably also are highly transparent to minimize light absorption so that a large perecentage of incident light is retroreflected. The microspheres often are substantially colorless but may be tinted or colored in some other fashion (see, for example, U.S. Pat. No. 3,294,559 to Searight et al. or U.S. Pat. No. 5,286,682 to Jacobs et al.). The microspheres may be made from glass, a non-vitreous ceramic composition, or a synthetic resin. In general, glass and cermaic microspheres are preferred because they tend to be harder and more durable than microspheres made from synthetic resins. Examples of micropsheres that may be useful in this invention are disclosed in the following U.S. Pat. Nos. 1,175,224, 2,461,011, 2,726,161, 2,842,446, 2,853,393, 2,870,030, 2,939,797, 2,965,921, 2,992,122, 3,468,681, 3,946,130, 4,192,576, 4,367,919, 4,564,556, 4,758,469, 4,772,511, and 4,931,414.

The microspheres typically have an average diameter of about 30 to 200 micrometers, and preferably of about 50 to 150 micrometers. Microspheres smaller than this range tend to provide lower levels of retroreflection, and microspheres larger than this range may impart an undesirably rough texture to the retroreflective article or may undesirably reduce its flexibility. Microspheres used in the present invention typically have a refractive index of about 1.2 to 3.0, preferably about 1.6 to 2.2, and more preferably about 1.7 to 2.0.

The polymeric material of the colored layer can contain organic polymers. A variety of organic polymer forming reagents can be used to make the polymer. Polyols and isocyanates can be reacted to form polyurethanes; diamines and isocyanates can be reacted to form polyureas; epoxides can be reacted with diamines or diols to form epoxy resins, acrylate monomers or oligomers can be polymerized to form polyacrylates; and diacids can be reacted with diols or diamines to form polyesters or polyamides. Examples of commercially available polymer forming reagents that may be used in forming the colored layer include: Vitel™ 3550 available from Bostik Inc., Middleton, Mass.; Ebecryl™ 230 available from UBC Radcure, Smryna, Ga., Jeffamine™ T-5000, available from Huntsman Corporation, Houston, Tex.; CAPA 720, available from Solvay Interlox Inc., Houston Tex.; and Acclaim™ 8200, available from Lyondell Chemical Company (formerly Arco Chemical Co.), Houston, Tex. Examples of reactive polymers useful in forming the colored layer include hydroxyalkylenes, polymeric epoxides such as polyalkylene oxides, and copolymers thereof. Examples of preferred polyurethane forming methods (into which reactive dyes can be incorporated) are described by Crandall in U.S. Pat. No. 5,645,938, U.S. patent application 08/797,062, pending and PCT published application WO 96/16343, and Fleming in U.S. Pat No. 5,976,669, and PCT published application WO 98/28642. Preferably, the organic polymer to which the dye is bonded is a polyester polyurethane, polyether polyurethane, or a polyurethane that includes a block copolymer of polyether and polyester units.

The polymer precursor can also include an acrylate monomer as a reactive diluent such that the acrylate monomer polymerizes via free-radical polymerization and the other reactive components such as polyols and isocyanates polymerize via a condensation polymerization. The polymerizations may occur contemporaneously. The reactive diluent allows for a higher solids loading level without the viscosity problems associated with handling higher viscosity solutions. It also eliminates the need for solvent and the problems associated with removing the solvent.

The polymer that is used in the colored layer may have functional groups that allow the polymer to be linked to a silane coupling agent, or the reactants that form the polymer may possess such functionality. For example, in producing polyurethanes, the starting materials may possess hydrogen functionalities that are capable of reacting with an isocyanate-functional silane coupling agent; see, for example, U.S. Pat. No. 5,200,262 to Li.

Reactive dyes can be used to form the colored layer. As a percentage of starting materials, the composition used to prepare the colored layer preferably comprises 0.1 to 40 weight % reactive dye, more preferably 0.5 to 20 weight %, and still more preferably 1 to 10 weight % reactive dye. Preferably, the reactive dye is functionalized with reactive groups such as amine, hydroxy, thiol, acylate, and epoxy. More preferably, the reactive dye has at least two reactive groups, such as a dihydroxy, to allow for polymer chain extension while a single reactive group, such as a monohydroxy dye, would result in chain termination. Examples of commercially available reactive dyes that may be used in forming the colored layer include Reactint X3LV, X15, 17AB, X41LV, X64, X77 X80LT, X95AB, and X96 available from Milliken Chemicals, Spartanburg S.C. The dye preferably does not contain heavy metals, particularly metals that may pose toxicity problems such as lead, chromium, cadmium, or mercury (see U.S. Pat. No. 5,286,682 to Jacobs et al.).

Examples of reactive polymer/dye systems useful in forming the colored layer include those described in U.S. Pat. Nos. 4,026,931, 4,137,243, 4,284,729, 4,507,407 and 4,846,846. In one preferred example, a colored layer is made by a reaction in which a polyether or polyester is reacted with an organic polyisocyanate and a primary-dihydroxyl-functionalized dye.

The colored layer preferably has an average thickness from about 5 nanometers to 1.5 times the average diameter of the microspheres. Preferably, the colored layer has an average thickness from about 100 nanometers to about the average diameter of the microspheres. More preferably, the colored layer's average thickness is about one (1) micrometer to about 0.25 times the average diameter of the microspheres. The colored layer thickness may be greater between the microspheres (that is closer to the exposed surface of the microspheres) than on the microspheres. The colored layer preferably is continuous, but there may be some very small regions—particularly at the most embedded portion of the microspheres—where the colored layer is discontinuous, i.e, its thickness is zero or approaches zero. Thus, the colored layer may be continuous or substantially continuous. The colored layer also may be sized or configured as described for the intermediate layer in U.S. Pat. No. 5,812,317 to Billingsly et al. (corresponds to WO97/15848).

As one alternative to a single colored layer, a first colored layer can be applied by printing to provide readable characters or graphics, and a second colored layer can be provided over the first to provide background color for the readable characters or graphics. Or a single colored layered could be used, and it could be applied in an imagewise fashion without a second colored layer to display a desired graphical image, characters, indicia, etc. A further advantage of the colored layers of the invention is their excellent adhesion to vapor deposited specular reflectors.

As indicated above, a reflective layer is disposed functionally behind the embedded portions of the optical elements. Preferably, the reflective layer is a specularly reflective layer such as a metal reflective layer. The term "metal reflective layer" means a layer comprising elemental metal in pure or alloy form which is capable of reflecting light. The metal may be a continuous coating produced by vacuum-deposition, vapor coating, chemical-deposition, or electroless plating. Vapor coating is preferred because the technique is economical, and the vapor deposited coating can have particularly good performance as a reflector. Typically, the metal reflective layer is about 50 to 150 nanometers thick.

A variety of metals may be used to provide a specularly reflective metal layer. These include aluminum, silver, chromium, nickel, magnesium, gold, tin, and the like, in elemental form. Aluminum and silver are preferred metals for use in the reflective layer because they tend to provide good retroreflective brightness. In the case of aluminum, some of the metal may be in the form of the metal oxide and/or hydroxide.

The binder layer comprises a polymer and may contain other materials. The binder layer adheres to or is otherwise physically associated with the reflective layer and typically an adhesive layer or a fabric backing. The binder layer is capable of supporting optical elements and is typically a continuous, fluid-impermeable, polymeric, sheet-like layer that has an average thickness of about 1 to 250 micrometers. Preferably, the average thickness is about 50 to 150 micrometers. Thicknesses less than 50 micrometers may be too thin to adhere to both the substrate and the optical elements, and thicknesses greater than 150 micrometers may unnecessarily stiffen the article and add to its cost.

The binder layer may comprise polymers that contain units such as urethane, ester, ether, urea, epoxy, carbonate, acrylate, acrylic, olefin, vinyl chloride, amide, alkyd, or combinations thereof and may comprise any of the polymers and silane coupling agents described above for the colored layer. Examples of preferred compositions for the binder layer are discussed by Crandall in U.S. Pat. No. 5,645,938 and International Publication WO 96/16343 (corresponds to U.S. Ser. No. 08/797,062) and by Fleming in U.S. patent application Ser. No. 08/777,718, and PCT published application WO 98/28642. A preferred binder layer may be made from about, in weight percent, 55% Capa™ 720 (a block copolymer of poly(tetramethylene glycol) and polycaprolactone), 16.4% ethoxylated bisphenol A diol, 4.4% ethoxylated trimethylolpropane, 4.1% isocyanatotriethoxysilane, 20.4% methylene-bis-diphenyl diisocyanate, and catalytic amounts of tertiary amine and dibutyltindilaurate.

The colored layer and the binder layer may contain other ingredients such as fillers, stabilizers (for example, thermal stabilizers and antioxidants such as hindered phenols and light stabilizers such as hindered amines or ultraviolet stabilizers), flame retardants, flow modifiers (for example, surfactants such as fluorocarbons or silicones), plasticizers, and elastomers. Care should be taken when selecting such additives because some may detrimentally affect laundering durability. For example, high levels of flame retardants such as melamine pyrophosphate may have a deleterious effect on the article's retroreflective performance after laundering.

The exposed lens retroreflective articles of the invention can provide a variety of desirable properties. Although the articles can have a retroreflectivity of less than 400 candelas/lux/meter$^2$, the articles typically have an initial retroreflectivity (that is, measured before being laundered), as measured by the Retroreflective Brightness procedure described below, of at least 400 candelas/lux/meter$^2$, more preferably at least 450 candelas/lux/meter$^2$, and retain at least 50%, more preferably at least 60%, of their retroreflected brightness after 25 cycles of the Industrial Laundering Procedure described below.

The inventive exposed lens retroreflective articles preferably exhibit the color of the colored layer in diffuse light but in retroreflective conditions exhibit less of the color of the colored layer. The articles also preferably have a color retention, as measured by the Color Measurement described in the Examples, such that neither the x or y color coordinates on the standard CIE 1931 chromaticity diagram change by more than 0.010, and Y does not decrease more than 20%, more preferably x or y do not change more than 0.0070 and Y does not decrease more than 10%, and most preferably x or y do not change more than 0.0050 and Y does not decrease more than about 5%, after 25 cycles of the Industrial Wash Procedure described in the Examples. This color measurement was developed by the Commission Internationale de l'Eclairage (CIE) and is based on the fact that any color can be represented as a combination of three primary colors each of which varies as a function of wavelength in the visible spectrum. A color can be objectively specified by the coordinates x, y and z of the chromaticity diagram that are needed to match a particular color. Values of X, Y, and Z are measures of the amount of color having CIE coordinates x, y, and z and are defined by the equations: $Y=y(X+Y+Z)$, $X=x(X+Y+Z)$, and $Z=z(X+Y+Z)$. Since $x+y+z=1$, and substituting $Y/y=(X+Y+Z)$ into the foregoing equations shows that a color (with intensity) can be completely defined by x, y and Y. The CIE color system is described in references such as Wyszecki and Stiles, Color Science, 2nd ed., John Wiley & Sons, 1982; and Judd, Color in Business, Science, and Industry, John Wiley & Sons, 1952.

Figure 2:
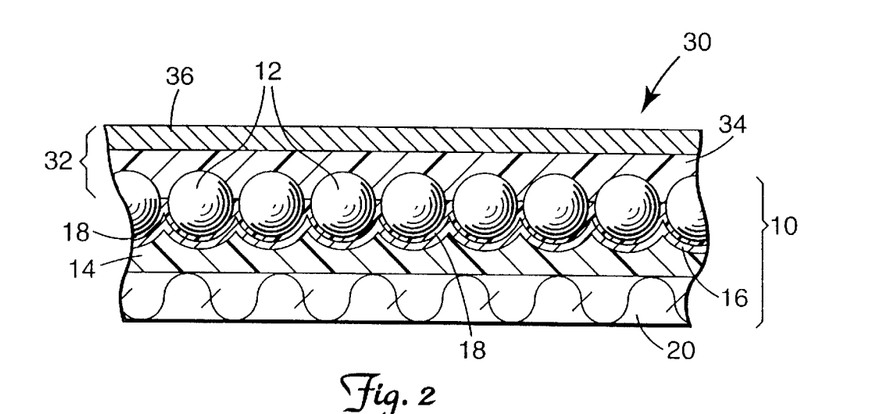
FIG. 2 illustrates a transfer article 30 that contains a retroreflective article 10 in accordance with the present invention.

A retroreflective article 10 can be made by first forming transfer article 30 shown in FIG. 2. In producing transfer 30, a multitude of microspheres 12 are partially embedded in the binder layer 14. This can be accomplished by first cascading the microspheres 12 onto a carrier web 32 in a desired temporary arrangement. Microspheres 12 preferably are packed as closely as possible on the carrier 32 and may be so arranged by any convenient process, such as printing, screening, cascading, or with a hot can roll. The microspheres 12 are partially embedded in the carrier 32 typically to about 30 to 60 percent of the microspheres' diameter. The portions of the microspheres that are not embedded in carrier web 32 protrude from the web so that they can subsequently receive the colored layer, the specularly reflective layer, and the binder layer in sequence.

Carrier web 32 can include a heat softenable polymer layer 34 on a paper sheet 36. Examples of useful polymer layers 34 for carrier web 32 include: polyvinyl chloride; polyolefins such as polyethylene, polypropylene, and polybutylene; and polyesters; et cetera. For a further discussion of applying microspheres to the carrier web, see U.S. Pat. Nos. 4,763,985; 5,128,804; and 5,200,262.

Polymer layer 34 retains microspheres 12 in the desired arrangement. Depending in part on the characteristics of the carrier web 32 and microspheres 12, it may be desirable to condition carrier 32 and/or microspheres 12 by applying selected release agents or adhesion promoters to achieve desired carrier release properties.

After the microspheres are partially embedded in the temporary carrier 32, the colored layer 18 is placed on the exposed portions of the microspheres. The colored layer 18 can be made by reacting polymers, oligomers, or monomers with the appropriate, chemically reactive dye. This can be accomplished, for example, by applying a solution of prepolymer components and reactive dye onto the protruding portions of the microspheres. A coupling agent (typically a silane) may be added for enhanced adhesion to the microspheres. After applying the solution, it preferably is only partially cured and the reflective layer 16 is applied to colored layer 18 on the side where the microspheres protrude from carrier 32. Then a solution of binder layer components and optional silane coupling agents can be applied onto the reflective layer 16. The binder layer 14 and the colored layer 18 then preferably are fully cured together to form the retroreflective article. A substrate 20 preferably is embedded in the binder layer composition before curing. The substrate 20 is secured to the binder layer 14 on the side opposite the reflective layer 16. Alternatively, if a fabric is not used, an adhesive may be applied to binder layer 14 (or to the binder layer composition before curing).

In the case of reacting with polyisocyanates, the reactive functional groups on the dye compound may include hydroxyls, amines, and/or thiols. A retroreflective article having improved color and retroreflectivity durability properties can be obtained by reacting a polyester resin, such as Vitel 3550™, with an isocyanate, a hydroxyl-functionalized reactive dye and an isocyanatosilane. The reactive dye and isocyante react with the polyester resin to form a colored, crosslinked polymer in a hardened layer. The isocyanatosilane binds to the surface of the microspheres and reacts with the polymer, and thus binds the transparent microspheres to the colored layer. When the reflective layer is silver, a mercaptosilane can be added to reduce corrosion and stabilize the surface of the silver layer. See U.S. Pat. Nos. 4,645,714 and 5,008,153.

Although the colored layer can be completely formed before the reflective layer and binder layer are applied, it has been discovered that it is best to cure the colored layer contemporaneously with the binder layer because improved laundering durability is generally obtained using such a procedure.

The inventive retroreflective articles may be applied to further substrates (not shown) using mechanical methods such as sewing. In some applications, however, it is desired to secure the article to the substrate by an adhesive layer (not shown). The adhesive layer can be, for example, a pressure-sensitive adhesive, a heat-activated adhesive, or an ultraviolet-radiation-activated adhesive.

The substrate bearing the retroreflective article can be located on the outer surface of an article of clothing, enabling the retroreflective article to be displayed when the clothing is worn in its normal orientation on the person. The substrate may be, for example: a woven or nonwoven fabric such as a cotton fabric; a polymeric layer including nylons, olefins, polyesters, cellulosics, urethanes, vinyls, acrylics, rubbers; leather; and the like.

An alternative technique for making an exposed lens retroreflective article is described in U.S. Pat. No. 3,420,597 to Nellessen et al.

Figure 3:
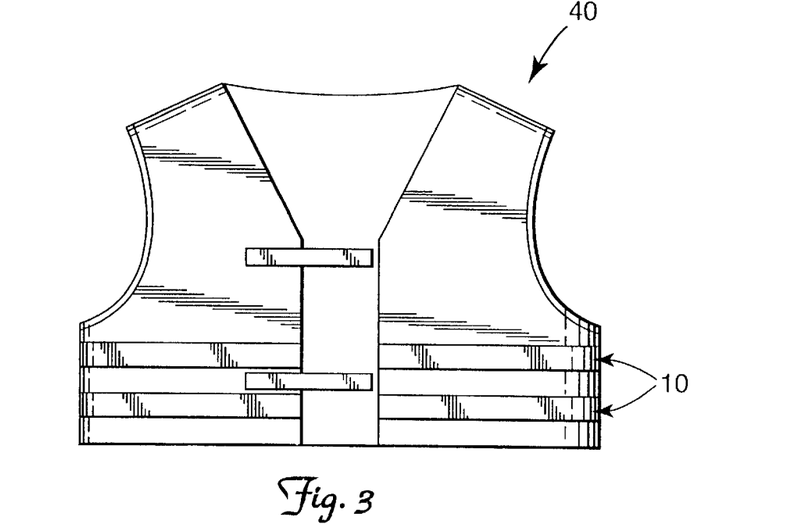
FIG. 3 illustrates an article of clothing 40 that displays a retroreflective article 10 in accordance with the present invention.

FIG. 3 illustrates a safety vest 40 that displays retroreflective articles 42 that are in the form of an elongated sheeting or strip, typically one to three inches wide. The retroreflective stripes may be bounded by fluorescent stripes as described in U.S. Pat. No. 4,533,592 to Bingham and U.S. Pat. No. 6,153,128 to Lightle et al. Safety vests often are worn by road construction workers to improve their visibility to oncoming motorists. These kinds of vests frequently become dirty and therefore need to be able to withstand harsh cleaning conditions so that the vest can be reused a number of times.

Although a safety vest 40 has been chosen for illustration, the article of clothing of the invention may come in a variety of forms. As the term is used herein, "article of clothing" means a launderable item of wearing apparel sized and configured to be worn or carried by a person. Other examples of articles of clothing that may display retroreflective articles of the invention include shirts, sweaters, jackets (e.g. firefighters' jackets), coats, pants, shoes, socks, gloves, belts, hats, suits, one-piece body garments, bags, backpacks, et cetera.

Advantages and other properties and details of this invention are further illustrated in the following Examples. It is to be expressly understood, however, that while the examples serve this purpose, the particular ingredients and amounts used and other conditions are not to be construed in a manner that would unduly limit the scope of this invention. The Examples selected for disclosure are merely illustrative of how to make a preferred embodiment of the invention and how the articles may generally perform.

EXAMPLES

The following tests and procedures were used in the examples.

Industrial Laundering Procedure

Industrial cleaning durability was evaluated by washing and drying a piece of fabric to which the retroreflective article was applied. The combined sequence of washing and drying is referred to as a cycle. The samples were washed using a Milnor System 7 Washing Machine Model 30015M4G from Pellerin Milnor Corp. In accordance with program no. 7 for heavily soiled, colored fabrics. The fabric was a 100 percent cotton towel, and the retroreflective article was secured to the fabric by sewing. The washer was loaded with enough pieces (approximately 80) of fabric (about 45 centimeters (cm) by 75 cm) to make a 28 pound load including from one to four pieces of fabric having several (typically about 5) retroreflective articles of the invention about 5 by 15 centimeters in size secured thereto.

The cleaning agents used were 90 ml of Lever Tech Ultra, a detergent (from Lever Industrial, North Charleston, S.C.) containing, by weight, approximately 10 percent potassium hydroxide, 25 percent potassium citrate, and 2 percent ethoxylated lauryl alcohol (the remaining contents are not known by the inventors), and 120 ml of Lever Tech Booster (a pH builder also from Lever Industrial) containing 20 percent sodium hydroxide (the remaining contents are not known by the inventors). In Program No. 7 the following steps are carried out to complete the washing portion of a cycle:

| Operation | Time (minutes) |
|---|---|
| Suds | 20.5 |
| Flush | 2 |
| Flush | 7 |
| Flush | 7 |
| Flush | 2 |
| Hot Rinse | 2 |
| Split Rinse | 2 |
| Cold Rinse | 4 |
| Extract | 6 |
| Total | 52.5 (55.0*) |

*Total time in minutes, which includes approximate fill times.

In the suds step, hot water (68 liters at 80° C.) and the cleaning agents are introduced into the machine washing basket under agitation. In the flush steps, fresh hot water (68 liters at 80° C.) is added to the washing basket after the same amount of the old water containing the cleaning agents is purged.

The rinse steps essentially are the same as the flush steps except the water becomes cooler. In the first rinse, the water is approximately 80° C., in the second rinse (split rinse), the water is approximately 46° C., and in the final cold rinse, the water is approximately 18° C. The washing basket is agitated during the flush and rinse steps. In the extract step, the machine undergoes a high-speed spin cycle to remove water from the washed samples. After washing but before being tested for retroreflectivity, the samples were dried in a Maytag™ home dryer at 140° F. (60° C.) on regular setting for about 30–35 minutes to complete an Industrial Wash Procedure Cycle. After the designated number of cycles, the retroreflective brightness at the middle of each sample was determined.

Retroreflective Brightness

Retroreflective Brightness was measured according to ASTM Test Specification E-810-94, entitled "Standard Test Method for Coefficient of Retroreflection of Retroreflective Sheeting," using an observation angle of 0.2° and an entrance angle of −4°. Retroreflective brightness is reported as a Coefficient of Retroreflection in units of candelas per lux per square meter (candelas/lux/meter$^2$).

Color Measurement

CIE color coordinates, as described in ASTM E308, were measured using a Hunter LabScan color measurement apparatus using a D65 light source, with 0/45° geometry. The term 0/45° means that the illuminating light source is shining at the surface at an angle of approximately 0 degrees from normal to the surface, and the color measurement is made by looking at an angle of approximately 45 degrees from normal to the surface. Color measurements were made on circular samples having diameters of 2.5 centimeters (1 inch).

| Component | Source |
|---|---|
| Lever Tech Ultra ™ detergent | Lever Industrial, North Charleston, South Carolina 29418 |
| Maytag ™ home dryer | Maytag, Newton, Iowa 50208 |
| Vitel ™ 3550 polyester resin | Bostik Inc., Boston Street, Middleton, Massachusetts 01949 |
| A-1310 silane and A-189 mercapto silane | OSI Specialties Inc., 39 Old Ridgebury Road, Danbury, Connecticut 06810 |
| CB-75 polyisocyanate | Bayer Corp. 100 Bayer Road, Pittsburgh, Pennsylvania 15205 |
| Washing machine | Pellerin Milnor Corporation, P.O. Box 400, Kenner, Louisiana 70063 |
| Primalux ™ and Excellerate ™ fabrics | Springs Industries Inc., 420 West White Street, Rock Hill, South Carolina 29730 |
| Milliken Reactin ™ X15 yellow dye, X64 red dye, and X96 orange dye | Milliken Chemicals, Spartanburg, South Carolina 29304 |
| 40 XD 200# aluminum flake | Harcross Chemicals Inc., 5200 Speaker Road, Kansas City, Kansas 66106 |
| 2,2' dimorpholinodethyl ether (DMDEE) catalyst | Huntsman Corporation, 3040 Post Oak Boulevard, #2200, Houston, Texas 77056 |

Example 1

A temporary microsphere carrier was prepared in the manner described in U.S. Pat. No. 5,474,827. Glass microspheres having a refractive index of about 1.9 and diameters in the range of 40–90 micrometers were cascaded onto a polyethylene layer disposed on a paper backing, in a manner which encouraged closest packing of the microspheres. The polyethylene layer was heated, and the microspheres were sunk into the polyethylene to a depth less than the diameter of the microspheres, so that a portion of the microspheres remained exposed above the surface of the polyethylene.

A colored layer coating solution was prepared by combining the following ingredients and mixing until a homogeneous solution resulted:

| | |
|---|---|
| 1056.25 | parts by weight methyl ethyl ketone |
| 56.25 | parts by weight toluene |
| 112.5 | parts by weight Vitel ™ 3550 polyester resin |
| 5 | parts of weight A-1310 isocyanatosilane |
| 9.1 | parts by weight CB-75 isocyanate |
| 0.651 | parts by weight A-189 mercaptosilane |
| 3 | parts by weight Milliken Reactint ™ X64 red dye |

The colored layer coating solution was coated onto the microspheres of the carrier using a bar coater having the metering bar set at a gap of 75 micrometers (0.003 inches) above the surface of the microspheres. The coating was first dried by forced air heated to 65.5° C. (150° F.) for two minutes, followed by 4 minutes at 82° C. (180° F.). The dried colored layer was then coated, within 48 hours, with a layer of vapor-deposited silver having a thickness of 85 nanometers. The vapor coating was performed using conventional evaporative vapor deposition techniques in a vapor deposition chamber.

A binder layer coating solution was prepared by combining the following ingredients and mixing until a homogeneous solution resulted:

| | |
|---|---|
| 25 | parts by weight methyl ethyl ketone |
| 25 | parts by weight toluene |
| 50 | parts by weight Vitel ™ 3550 polyester resin |
| 2 | parts by weight A-1310 isocyanatosilane |
| 3 | parts by weight CB-75 isocyanate |
| 0.25 | parts by weight A-189 mercapto silane |
| 0.4 | parts by weight aluminum flake |
| 0.025 | parts by weight DMDEE catalyst |

A binder layer was formed over the vacuum deposited silver layer by applying the binder layer coating solution onto the silver layer using a laboratory handspread bar coater with the metering bar set to a gap of 200 micrometers (0.009 inches) above the surface of the silver layer. The coated layer was dried at 65.5° C. (150° F.) for 15 seconds to form a partially dried layer. A 100% polyester fabric obtained from Milliken was laid onto the partially dried coating. Further drying was performed by subjecting the combined coating and fabric to heated air, first at 65.5° C. (150° F.) for 1 minute, followed by 107° C. (225° F.) for 5 minutes. Final cure of the sample was performed by allowing the sample to set for several weeks at room temperature before testing. Shortly before testing, the polyethylene carrier layer was removed to expose the uncoated side of the microspheres.

When viewed under normal ambient lighting conditions, the resulting sample exhibited a pale pink color, and when viewed with a bright beam of retroreflected light, the sample exhibited a bright silver color. Color and retroreflective brightness were measured before and after subjecting the sample to 25 wash cycles in a Milnor industrial washer as described in the Industrial Laundering Procedure. The retroreflective brightness results before and after 25 cycles of the prescribed industrial wash were as follows:

Before Washing: 486 candelas/lux/meter$^2$

After Washing: 328 candelas/lux/meter$^2$

Thus, the article retained 67% of its retroreflective brightness after 25 industrial wash cycles.

The CIE color coordinates before and after washing were as follows:

| CIE Coordinates | Y | x | y |
|---|---|---|---|
| Initial color | 18.56 | .3600 | .3262 |
| Color After 25 Washes | 15.21 | .3552 | .3282 |

Thus, the article had a color retention such that the x and y coordinate values changed by less than 0.005 each, and Y changed by less than 3.5 after 25 industrial wash cycles. Thus the hue remained virtually identical while the color intensity was reduced by less than 20%.

Example 2

A colored coating solution was prepared by combining the following ingredients and mixing until a homogeneous solution resulted:

| | |
|---|---|
| 1690.00 | Parts by weight methyl ethyl ketone |
| 350.00 | Parts by weight Vitel ™ 3550 polyester resin |
| 4.25 | Parts by weight A-1310 isocyanatosilane |
| 14.00 | Parts by weight CB-75 isocyanate |
| 1.00 | Parts by weight A-189 mercaptosilane |
| 0.60 | Parts by weight Milliken X96 orange dye |
| 1.25 | Parts by weight Milliken X15 yellow dye |

The colored layer coating solution was coated onto the microspheres that were partially embedded in a carrier prepared as described in Example 1 using a bar coater having the metering bar set at a gap of 75 micrometers (0.003 inches) above the surface of the microspheres. The coating was first dried by subjecting it to air heated to 65.5° C. (150° F.) for two minutes, followed by 4 minutes at 82° C. (180° F.). The dried colored layer was then coated, within 48 hours, with a layer of vapor deposited silver having a thickness of 85 nanometers.

A binder layer coating solution was prepared by combining the following ingredients and mixing until a homogeneous solution resulted:

| | |
|---|---|
| 25 | Parts by weight methyl ethyl ketone |
| 25 | Parts by weight toluene |
| 50 | Parts by weight Vitel ™ 3550 polyester resin |
| 2 | Parts by weight A-1310 isocyanatosilane |
| 3 | Parts by weight CB-75 isocyanate |
| 0.25 | Parts by weight A-189 mercaptosilane |
| 0.4 | Parts by weight aluminum flake |
| 0.025 | Parts by weight DMDEE catalyst |

A binder layer was formed over the vacuum deposited silver layer by applying a binder layer coating solution onto the silver layer using a laboratory handspread bar coater with the metering bar set to a gap of 200 micrometers (0.009 inches) above the surface of the silver layer. The coated layer was dried at 65.5° (150° F.) for 15 seconds to form a partially dried layer. A 100% polyester fabric obtained from Miliken was laid onto the partially dried coating. Further drying was then performed by subjecting the combined coating and fabric to heated air, first at 65.5° (150° F.) for 1 minute, followed by 107° C. (225° F.) for 5 minutes. Final cure of the sample was performed by allowing the sample to set for several weeks at room temperature before testing. Shortly before testing, the polyethylene carrier layer was removed to expose the uncoated side of the microsphere layer.

When viewed under normal ambient lighting conditions, the resulting sample exhibited a pale brownish gold color, and when viewed with a bright beam of retroreflected light, the sample exhibited a bright silver color. Color and retroreflective brightness were measured before and after subjecting the sample to 25 wash cycles in a Milnor industrial washer as described in the Industrial Laundering Procedure. The retroreflective brightness results before and after 25 cycles of the prescribed industrial wash were as follows:

| Before Washing: | 668 candelas/lux/meter$^2$ |
| After Washing: | 388 candelas/lux/meter$^2$ |

Thus, the article retained 58% of its retroreflected brightness after 25 industrial wash cycles.

The CIE color coordinates before and after washing were as follows:

| CIE Coordinates | Y | x | y |
|---|---|---|---|
| Initial color | 25.12 | .3515 | .3653 |
| Color After 25 Washes | 23.80 | .3549 | .3677 |

Thus, the article had a color retention such that the x and y coordinate values changed by less than 0.005 each and Y changed by less than 1.4, after 25 industrial wash cycles. Thus the hue remained virtually identical while the color intensity was reduced by about 5%.

The disclosures of all patents and patent applications cited above are incorporated by reference into this document as if reproduced in full. Cofiled patent application U.S. Ser. No. 09/335,068 (pending) entitled Retroreflective Article Having A Colored Layer Containing Reflective Flakes And A Dye Covalently Bonded To A Polymer by Fleming, is also wholly incorporated by reference into this document.

The invention may be suitably practiced in the absence of any item or element not described above.

What is claimed:

1. An exposed lens retroreflective article that comprises:
   (a) a binder layer;
   (b) a layer of optical elements that is partially embedded in the binder layer;
   (c) a reflective layer that is located functionally behind the layer of optical elements; and
   (d) a colored layer that comprises a dye that is covalently bonded to a polymer, the colored layer being disposed between the layer of optical elements and the reflective layer.

2. The exposed lens retroreflective article of claim 1, wherein the optical elements are light transmissive microspheres, and the colored layer is thicker closer to the exposed surface of the microspheres; and
   wherein the article exhibits the color of the colored layer in diffuse light, but in retroreflective conditions exhibits relatively less of the color of the colored layer.

3. The exposed lens retroreflective article of claim 1, wherein the optical elements are light transmissive microspheres.

4. The exposed lens retroreflective article of claim 3, wherein the colored layer further comprises a silane coupling agent.

5. The exposed lens retroreflective article of claim 4, wherein the colored layer consists essentially of the polymer, the dye, and the silane coupling agent and does not contain a pigment.

6. The exposed lens retroreflective article of claim 3, wherein neither the x or y color coordinates on the standard CIE 1931 chromaticity diagram change by more than 0.010 and Y decreases by no more than 20% after 25 cycles of the Industrial Laundering Procedure.

7. The exposed lens retroreflective article of claim 6 having a coefficient of retroreflection of at least 450 candelas/lux/meter$^2$ and retaining at least 60% of its retroreflected brightness after 25 cycles of the Industrial Laundering Procedure.

8. The exposed lens retroreflective article of claim 1, wherein the polymer comprises a polyester.

9. The exposed lens retroreflective article of claim 1, wherein the reflective layer is a specularly reflective vapor deposited metal layer.

10. The exposed lens retroreflective article of claim 9, wherein the metal layer comprises aluminum or silver or tin.

11. The exposed lens retroreflective article of claim 1, wherein the binder layer comprises a polymeric material made from a monomeric unit selected from the group consisting of urethane, ester, ether, urea, epoxy, carbonate, acrylate, acrylic, olefin, vinyl chloride, amide, alkyd, and combinations thereof.

12. The exposed lens retroreflective article of claim 11, wherein the binder layer has an average thickness of about 50 to 150 micrometers.

13. The exposed lens retroreflective article of claim 1, wherein neither the x or y color coordinates on the standard CIE 1931 chromaticity diagram change by more than 0.010 and Y decreases by no more than 20% after 25 cycles of the Industrial Laundering Procedure.

14. The exposed lens retroreflective article of claim 1 having a coefficient of retroreflection of at least 400 candelas/lux/meter$^2$ and retaining at least 50% of its retroreflected brightness after 25 cycles of the Industrial Laundering Procedure.

15. The exposed lens retroreflective article of claim 1, wherein the colored layer is made by a process comprising reacting polymers, oligomers, or monomers with a chemically reactive dye.

16. The exposed lens retroreflective article of claim 15, wherein the colored layer is made by a process comprising reacting a polyester, an isocyanate, and a hydroxyl-functionalized reactive dye.

17. The exposed lens retroreflective article of claim 1, further comprising a fabric or an adhesive secured to the binder layer on a side opposite the specularly reflective layer.

18. The exposed lens retroreflective article of claim 1, wherein the optical elements are light transmissive microspheres, and further comprising a second colored layer that is disposed between the first colored layer and the reflective layer;
   wherein the first colored layer and the second colored layer are different colors; and
   wherein the first colored layer is configured as readable characters or graphics and the second colored layer provides background color for the readable characters or graphics.

19. An article of clothing that comprises the exposed lens retroreflective article of claim 1, the retroreflective article being secured to an outer surface of the article of clothing.

20. The article of clothing of claim 19 being a firefighter's jacket or a safety vest.

21. A transfer article that comprises:
   the retroreflective article of claim 1; and
   a carrier web into which the layer of microspheres is also partially embedded.

22. The exposed lens retroreflective article of claim 1, wherein the optical elements comprise microspheres, and wherein the colored layer has an average thickness that is about 5 nanometers to 1.5 times the average diameter of the microspheres.

23. The exposed lens retroreflective article of claim 1, wherein the optical elements comprise microspheres, and wherein the colored layer has an average thickness of about 100 nanometers to about the average diameter of the microspheres.

24. The exposed lens retroreflective article of claim 1, wherein the optical elements comprise microspheres, and wherein the colored layer has an average thickness of about 1 micrometer to about 0.25 times the average diameter of the microspheres.

\* \* \* \* \*

UNITED STATES PATENT AND TRADEMARK OFFICE
CERTIFICATE OF CORRECTION

PATENT NO. : 6,361,850 B1
DATED : March 26, 2002
INVENTOR(S) : Billingsley, Britton G.

It is certified that error appears in the above-identified patent and that said Letters Patent is hereby corrected as shown below:

Column 2,
Line 32, insert the word -- be -- following the word "may".

Column 6,
Line 3, delete the word "cermaic" and insert in place thereof -- ceramic --.

Signed and Sealed this

Twenty-third Day of July, 2002

Attest:

Attesting Officer

JAMES E. ROGAN
Director of the United States Patent and Trademark Office